July 13, 1954  C. B. BAVER  2,683,590
AUTOMATIC FLUID HEAT EXCHANGE APPARATUS
Filed Oct. 29, 1949  2 Sheets-Sheet 1

INVENTOR
Clyde B. Baver
BY
ATTORNEY

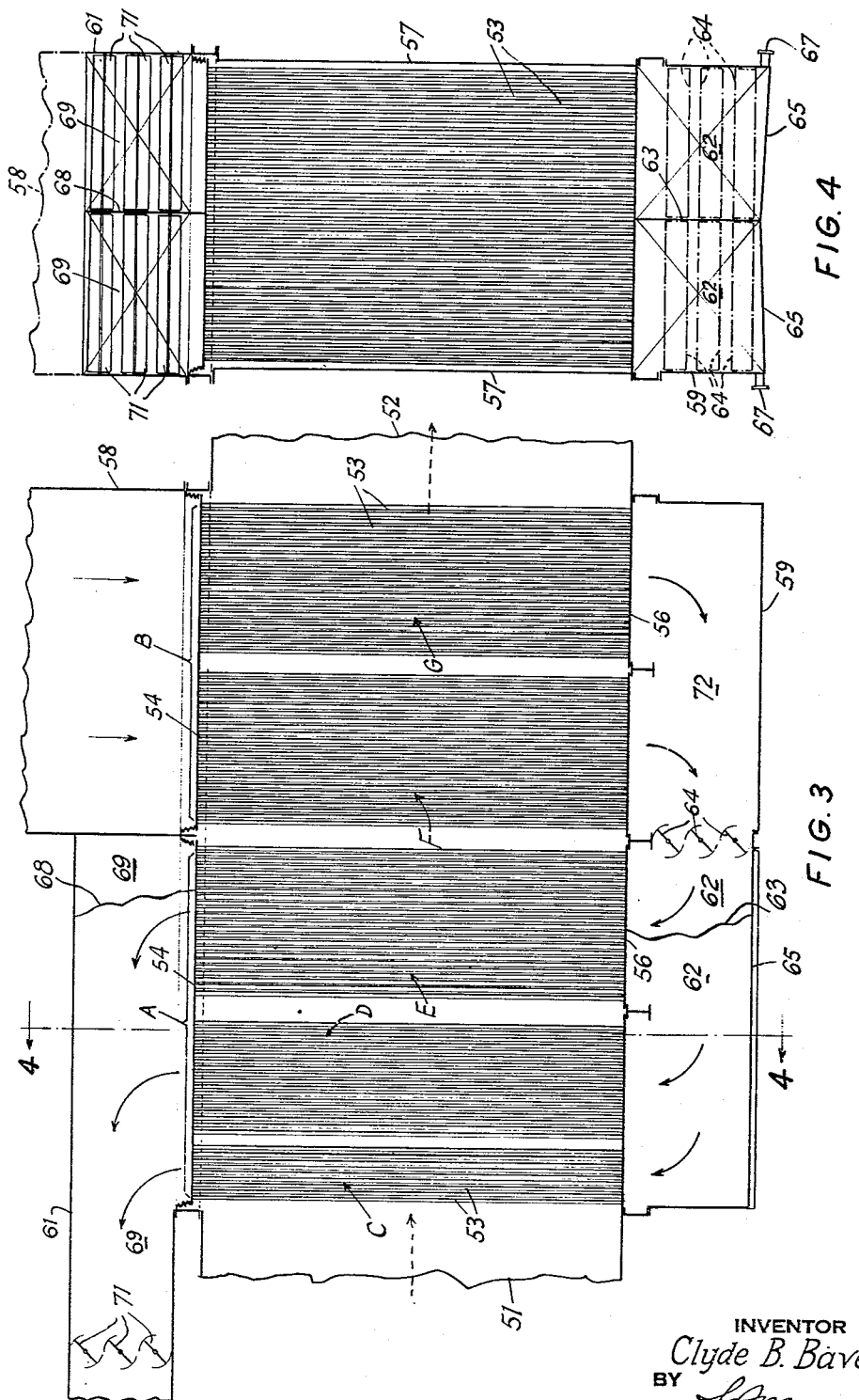

Patented July 13, 1954

2,683,590

UNITED STATES PATENT OFFICE 2,683,590

AUTOMATIC FLUID HEAT EXCHANGE APPARATUS

Clyde B. Baver, Fanwood, N. J., assignor to The Babcock & Wilcox Company, New York, N. Y., a corporation of New Jersey Application October 29, 1949, Serial No. 124,472

7 Claims. (Cl. 257—2)

The present invention relates to the construction and operation of heat exchange apparatus of the type providing for the indirect transfer of heat from one fluid to another; an especially useful application of my invention being in connection with air heaters wherein the heating medium may be, for example, the hot gaseous products of combustion from a boiler furnace, while the medium to be heated may be the major portion of the air required for combustion of fuel within the furnace.

In the conventional form of air heater wherein heat is transferred from combustion gases to combustion air, separate passages are provided through which the gases and air are directed in heat exchange relation, the transfer of heat from one fluid to the other taking place through metallic walls which separate the passages, and which walls may be provided by heat transfer elements in the form of spaced metal plates or, more generally, in the form of spaced metal tubes.

In an air heater wherein the heat exchange elements are provided by spaced metal tubes arranged in one or more banks, the heating fluid such as hot combustion gases may be directed through the tubes and thus through one set of passages, and the air directed over the outer surfaces of the tubes, and thus through a second set of passages provided between the tubes. A counterflow relation of air flow to gas flow is ordinarily maintained throughout the passages of any one bank, or succession of banks, for maximum rate of heat transfer from one fluid to the other. In the operation of such an air heater, it is known that those portions of the tube lengths adjacent the cold air inlet are subject to fairly rapid corrosion unless the air heater is operated so as to maintain all portions of the tubes adjacent the air inlet zone at temperatures high enough to prevent the condensation of vapors passing through the tubes.

The corrosive effect mentioned is generally the result of the condensation of water vapor carried by the heating gases flowing in contact with the metallic heat transfer surfaces, combined with the presence of a gaseous constituent such as sulphur dioxide resulting from combustion of the fuel by which the gases are generated. The condensation is promoted when the metal of the tubes, for example, adjacent the cooler gas exit end is compelled to operate at relatively low temperatures due to the continuous contact of cold inlet air with one surface of each heat transfer element or tube, and to the continuous contact of cooled gases with the opposite surface. Condensation of the aqueous vapor also maintains the low temperature surface in a moist condition which is conducive to the collection of dust particles on the surface and to the consequent decrease in heat transfer efficiency. When the heat transfer elements are provided by tubular members of relatively small diameter through which particle carrying gases are directed, such members are liable to become plugged and their effectiveness as heat transfer elements thus completely nullified. A similar effect results from the use of heat transfer elements formed as plates and arranged at relatively close spacings so as to define narrow gas flow passages therebetween.

My invention is therefore concerned with improvements in heat exchangers of the indirect heat transfer type arranged, for example, for heating combustion air by means of hot gases resulting from the combustion of fuel. Instead of employing the conventional counterflow arrangement of passages which results in gases of minimum temperature being brought into contact with heat transfer elements exposed to the entering cold air, I provide a modified arrangement which, in addition to employing the counterflow principle, provides for gases of maximum temperature, or at least of intermediate temperature, to be directed into contact with heat transfer elements located adjacent the cold air inlet, thereby maintaining the metal of such elements at the cold end of the heater at temperatures high enough to minimize the condensation of vapors contacting therewith.

While the maintenance of suitably high metal temperatures adjacent the cold air inlet tends to obviate plugging of the gas flow areas, within tubes or between plates, by minimizing the accumulation of solids, nevertheless after prolonged operation, or with gases containing a large proportion of solids, a cleaning of the heat transfer elements becomes a necessary operational procedure which, with air heaters of the usual construction, requires complete shutdown of the boiler with which the air heater is associated. However, in accordance with my present invention, I provide a construction of air heater which enables each section to be selectively isolated for cleaning purposes, while another is maintained in service, at suitably reduced boiler capacity.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 3 is a sectional side elevation of a tubular air heater representing a modified form of my invention; and Fig. 4 is a sectional end elevation of the air heater shown in Fig. 3, taken along line 4—4.

Figure 2:
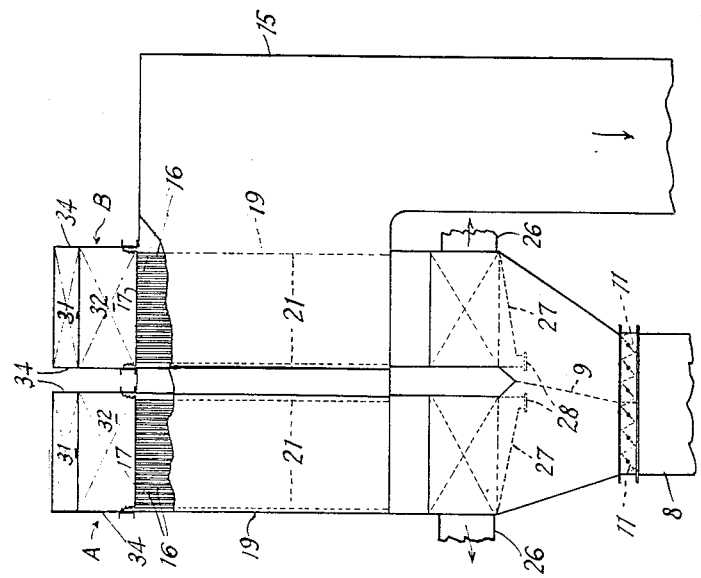
Figs. 1 and 2 are side and end elevations respectively, partially broken away, of a tubular air heater representing an embodiment of my invention.
Figure 1:
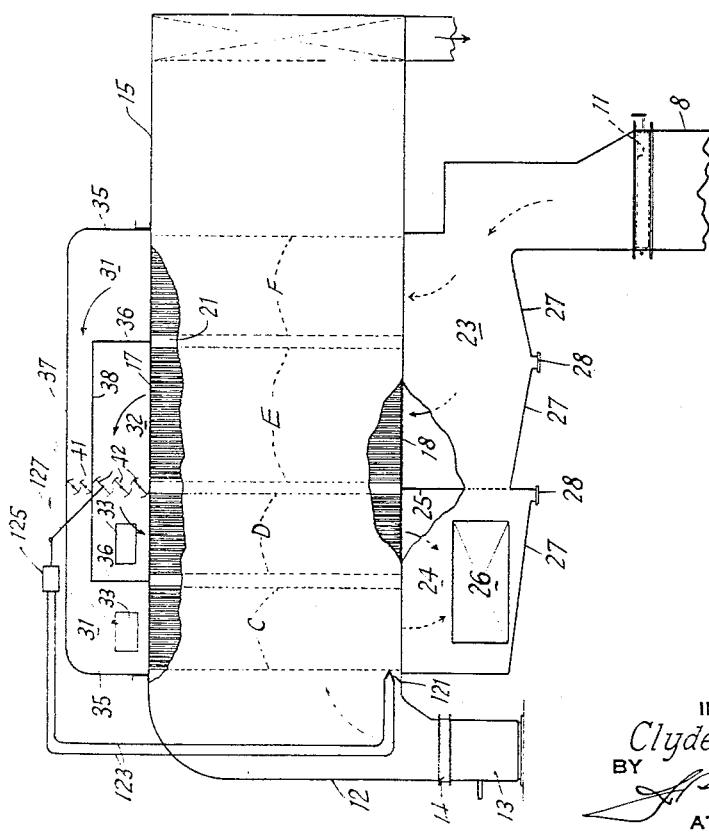

In more detail, and referring specifically to Figs. 1 and 2, the air heater assembly as shown comprises duplicate units A and B having gas inlet conduit means 8 adapted to receive hot gases of combustion originating from a suitable source, such as a boiler furnace, not shown, and provided with a diaphragm 9 so as to form separate duct sections or branches leading to the respective units A and B, suitable damper means 11 being provided at the entrance to each gas inlet duct section or branch. Air inlet conduit means 12 are provided which, if desired, may be similarly divided into branch sections, or formed as separate ducts, leading to the respective air heater units A and B, with each section or duct adapted to receive air to be heated as delivered thereto by a forced draft fan 13. Suitable damper means 14 may be provided between the outlet of each fan 13 and the corresponding inlet branch section or duct. A common air outlet duct 15 is provided for delivering heated combustion air to burners or other apparatus associated with the furnace. Each air heater, or air heater unit, comprises tubes 16 arranged upright in horizontally successive groups or banks C, D, E and F, with the tubes connected at their opposite ends to upper and lower tube sheets 17 and 18 respectively which, together with upright side plates 19 define a flue 21 for directing air from inlet 12 across the tubes of banks C, D, E and F of each air heater in the order named.

A gas inlet chamber 23 is provided beneath the air heater banks E and F of each unit at one end, and a gas outlet chamber 24 beneath the air heater banks C and D of each unit at the opposite end, the chambers being suitably separated by a common upright wall or partition 25. Inlet chambers 23 are connected to the common gas inlet duct 8, while each outlet chamber 24 is provided with a gas outlet 26 for connection to an induced draft fan, not shown. Each chamber is provided with bottom walls 27 sloping toward a drain connection 28 for disposing of wash water for purposes hereinafter explained.

Gas passages 31 and 32 are provided above the upper tube sheets 17 of the respective units A and B for directing gases from the tubes of one bank to the tubes of a succeeding bank. The outer passage 31 provides a gas flow connection from the upper tube ends of bank F to the upper tube ends of bank C, while the inner passage 32 provides a similar gas flow connection between the upper tube ends of banks E and D. Both passages extend between side walls 34 which are substantially aligned with the upright flue walls 19. Each passage 31 is further defined by upright end walls 35 located beyond the two outer banks C and F, and each passage 32, by upright end walls 36 of which one is positioned between banks C and D, and the other, between banks E and F. The upper boundaries of passages 31 and 32 are provided by horizontal walls 37 and 38, respectively. A multi-leaf damper 41 extends across the entire cross-section of the outer passage 31, at a location between the outer banks C and F, while a similar multi-leaf damper 42 extends across the entire cross-section of the inner passage 32, at a location between the inner banks D and E.

Gases entering the lower inlet chamber 23 are admitted to the lower ends of tubes 16 forming the banks E and F and, with both dampers 41 and 42 in open positions, the gases flow upwardly through both banks E and F in parallel, and continue through the connecting passages 31 and 32 to the two banks C and D through which the gases flow downwardly in parallel to the lower gas outlet chamber 24 and thence through the gas outlet 26. However, the provision of separate connecting passages 31 and 32 results in a novel two-pass gas flow arrangement wherein gases leaving bank F located adjacent the heated air outlet 15 are directed into bank C located adjacent the cold air inlet 12, while the gases leaving bank E are directed into the next adjacent bank D. The serial flow of gas through banks F and C, and through banks E and D, is therefore countercurrent to the flow of air therethrough.

The air flowing from air inlet conduit 12 to outlet duct 15 thus passes over tubes 16 which are heated by the internal flow of hot gases and, in passing over tubes 16 in successive banks, the air is progressively heated from a relatively low temperature in conduit 12 to a relatively high temperature when it enters conduit 15. In the respective banks, the air passing through bank C is at a lower temperature than when it passes through bank D, and similarly, when passing through bank E, is at a lower temperature than when passing through bank F. Thus, the gases flowing through the tubes of bank F are cooled to a lesser degree than the gases passing through the tubes of bank E because of the relatively higher temperature of air flowing over the tubes of bank F. Gases discharged from bank F, and directed through chamber 31 to the tubes of bank C are therefore at a higher temperature than the gases discharged from bank E and directed through chamber 32 to the tubes of bank D. By directing the higher temperature gases to the tube bank C, such gases in flowing through the tubes of the bank are at a sufficiently high temperature so that the cooling action of air passing over the tubes does not reduce the temperature of the gases to a degree which would cause serious condensation of vapor.

Moreover, the gas flow area provided through tube bank C is less than the gas flow area through tube bank F due to the smaller total number of tubes in bank C, both with respect to the number of tube rows provided and to the average number of tubes per row. As a result of the reduced gas flow area through bank C, as compared with bank F, the velocity of gas flow through tube bank C is increased and, accordingly, the rate of heat absorption by tubes in bank C, so as to assist in the maintenance of an adequately high metal temperature of tubes contacted by air entering from conduit 12. Furthermore, due to the wider spacing of tubes in bank C than in bank F, the velocity of air flow through bank C is relatively lower and results in a correspondingly lower rate of heat absorption by the air which also contributes to the maintenance of tube metal temperatures in bank C higher than the temperature of vapor condensation.

In bank E, the gases enter the tubes at the same temperature as the gases which enter the tubes of bank F but, in flowing through the tubes of bank E, the gases are subjected to the cooling action of colder air than that passing over the tubes of bank F. The gases leaving bank E therefore enter chamber 32 at a temperature lower than the temperature of the gases leaving bank F but, since the temperature of the air passing over the tubes of bank D, through which the gases from chamber 32 next flow, is higher than the temperature of the air passing over the tubes of bank C, the temperature of gases flowing through the tubes of bank D is not reduced to a temperature at which condensation in any considerable degree is liable to occur. Moreover, the provision of a smaller number and more widely spaced tubes in bank D than in bank E is also a factor in maintaining suitably high tube metal temperatures in bank D.

As a further aid to the maintenance of metal temperatures in tube bank C above the temperature of vapor condensation, particularly at low loads, dampers 41 and 42 may be regulated so as to increase the proportion of the higher temperature gases flowing from tube bank F to tube bank C in relation to the proportion of the lower temperature gases flowing from bank E to bank D. This would involve, for example, maintaining damper 41 in the full-open position, and damper 42 in a partially closed position, or by otherwise regulating the respective damper positions so as to provide the relative proportion of gas distribution required. It will be understood that damper regulation may be effected manually, at the will of an operator, or by suitable automatic means such as is diagrammatically indicated in Fig. 1. In the arrangement shown, a thermoelement 121 is positioned adjacent a tube or tubes of bank C, in or adjacent the tube row initially contacted by the entering air, and adjacent the lower gas outlet end of the bank, and thus in a zone wherein vapor condensation is most likely to occur, and at the maximum rate. Leads 123 extend from the thermoelement 121 to a conversion apparatus 125 of known type, wherey the electrical impulse from element 121 is translated into a damper operating force which is transmitted to damper 42, for example, by suitable connecting means 127.

The height of passage 32 overlying banks D and E is made greater than the height of passage 31 between the horizontal walls 37 and 38 due to the necessity of providing adequate gas turning space for gases passing from bank E into bank D, whereas in the corresponding portion of passage 31 the flow of gases is substantially horizontal and straight so as to require a lesser height throughout this intermediate portion.

In the event that the tubes in one or more banks should become plugged, or the accumulation of solids on the inner surfaces of the tubes should become excessive, provision is made for washing one portion of the air heater while the remaining portions are maintained in service. Thus, in either unit A or B, by closing the damper 41 in passage 31, while damper 42 in passage 32 remains open, the heating gases are directed in series through banks D and E, but are prevented from entering and passing through the cold air inlet bank C where accumulations are likely to be maximum. Access doors 33, such as those indicated in Fig. 1, may be provided at suitable locations in one or more walls of passage 31, or the walls formed with removable panels, whereby a hose, for example, may be introduced for directing water downwardly through the tubes so as to wash away the accumulated solids or other matter which might reduce the rate of heat transfer or which might lead to deterioration of the tubes. Similarly, for cleaning or washing the tubes of bank D, damper 42 in the inner passage 32 is moved to its closed position, while damper 41 in passage 31 remains open, thereby blocking off gas flow into and through bank D, while directing the heating gases in series through the end banks F and C. If the tubes of bank E or bank F in unit A or B should require similar cleaning or washing, the supply of heating gas to the particular unit involved may be cut off by closing the corresponding damper 11.

The modified form of air heater shown in Figs. 3 and 4 provides for two pass heating gas flow through successive tube sections A and B, over which air is directed in a single pass from a cold air inlet duct 51 to a hot air outlet duct 52. Each tube section A and B comprises upright tubes 53 connected at opposite ends to upper and lower tube sheets 54 and 56 which with side walls 57 define a flue through which air is directed across the tubes in both sections. The air inlet section A comprises tubes 53 arranged in three banks C, D and E, while the air outlet section B comprises tubes 53 arrangtd in two banks F and G, with the tubes in the air inlet bank C more widely spaced across the width of the flue than the tubes in bank D, and similarly with respect to the tubes in bank D relative to the transverse spacing of tubes in succeeding banks E, F and G.

A gas inlet duct 58 is positioned over tube section B for directing heating gases into the tubes of section B through which the gases flow downwardly in a single pass to a duct 59 extending beneath both air heater sections A and B for conducting the gases from the lower end of the downflow first gas pass section B to the lower end of the upflow second gas pass section A. The gases then pass upwardly through section A and are discharged into the upper gas outlet duct 61. Provision is made for cleaning and washing the second gas pass section A by dividing that portion of duct 59 below the second pass section A into separate chambers or passages 62 by means of an upright partition 63 extending longitudinally of gas flow. Multi-leaf dampers 64 are positioned across the entrances to the respective chambers 62 at a location intermediate tube sections A and B, as indicated. Each chamber 62 is formed with a bottom wall 65 sloping downwardly to a drain outlet 67 for disposal of wash water. The gas outlet duct 61 above tube section A is correspondingly divided by a longitudinal partition 68 so as to define separate gas outlet chambers or passages 69, and a multi-leaf damper 71 is positioned across each passage 69 at a downstream position relative to all gas exits from the tube bank section A.

In the operation of the air heater illustrated in Figs. 3 and 4, the flow of heating gases in two passes through the tube bank sections B and A is countercurrent to the flow of air through these sections. Thus, the hottest gases pass through the first gas pass section B in heat transfer relation to air which has been previously heated in the second gas pass section A by flowing across the tubes of successive banks C, D and E in the order named. The gases are discharged from banks F and G at different temperatures, somewhat lower than the initial gas inlet temperature, but are mingled in the space 72 beneath the banks, and in the passages 62, so as to enter the tubes of all second pass banks C, D and E at a substantially common intermediate temperature. Due to the relatively wide spacing of tubes, in transverse rows, in banks C and D, as compared with the spacing in similar rows in banks E, F and G, the air passes between tubes C and D at lower velocities than in succeeding banks, so as to result in a lower rate of heat absorption by the air, and thus tend to maintain the tube metal in banks C and D, at least, at temperatures high enough to prevent the condensation of vapor.

In order to allow for water washing of tubes in the second gas pass, if and when required, the dampers 64 and 71 at one side of partitions 63 and 68 are closed, while the other dampers 64 and 71 at the opposite side of partitions 63 and 68 are left open, thereby blocking off gas flow through one half of all second pass banks C, D and E, while allowing gases to continue to flow through the other half of these same banks. Access doors similar to those previously described may be provided to permit insertion of a hose or other means for directing water into and through the tubes of the now idle half of the pass. The other half of the second pass may be prepared for cleaning or washing, while the first half is in operation, by similarly closing dampers 64 and 71 at the opposite side of partitions 63 and 68, with the dampers at the first side in open position.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. An air heater having upright gas conducting tubes arranged in horizontally successive sets of banks, conduit means containing said tube banks and providing an air inlet and an air outlet between which air is directed over said sets of tube banks in series in heat transfer contact therewith, gas inlet conduit means arranged to direct heating gas into the tubes of that set of said banks which is nearest to said air outlet, gas outlet conduit means arranged to receive heating gas discharged from that set of said banks which is nearest to said air inlet, other conduit means connecting said sets of banks for series flow of heating gas through said sets and having partition means forming passages separately connecting the respective tube banks of one set to the respective tube banks of the other set, separately operable damper means in each of said passages, and control means operable in response to tube temperatures in the bank nearest said air inlet for operating the damper means in one of said passages.

2. An air heater having tubes arranged in banks, a plurality of said banks constituting one set of said banks and a remaining plurality of said banks constituting a separate set of said banks, conduit means containing said tubes and providing an air inlet and an air outlet for directing air over said sets of tube banks in series in heat transfer contact therewith, gas inlet conduit means arranged to direct heating gas into the tubes of said one set of banks, gas outlet conduit means arranged to receive said gas from the tubes of said separate set of said banks, other conduit means forming separate gas flow passages arranged to receive the total gas discharged from tubes of said banks in said one set and to distribute said total gas to tubes of said banks in said separate set, and separately operable damper means in each of said passages.

3. A fluid heater having upright gas conducting tubes arranged in horizontally successive groups, conduit means containing said tube groups and providing a fluid inlet and a fluid outlet between which fluid to be heated is directed over said tube groups in series in heat transfer contact therewith, gas inlet conduit means disposed at one end of said tubes and arranged to direct heating gas into tubes of the group nearest said fluid outlet, gas outlet conduit means disposed at the same end of said tubes and arranged to receive heating gas discharged from tubes of the group nearest said fluid inlet, other conduit means disposed at the opposite end of said tubes and connecting said groups of tubes for series flow of heating gas through said tube groups, said other conduit means having one portion formed as a compartment open to said group of tubes nearest said fluid outlet and having its remaining portion provided with partition means forming gas flow passages respectively connecting said compartment to separate pluralities of tubes of said group nearest said fluid inlet, and separately operable damper means in each of said passages.

4. A fluid heater having upright gas conducting tubes arranged in horizontally successive sections, conduit means containing said tube sections and providing a fluid inlet and a fluid outlet between which fluid to be heated is directed over said tube sections in series in heat transfer contact therewith, gas inlet conduit means arranged to direct heating gas into tubes of the section nearest said fluid outlet, gas outlet conduit means arranged to receive heating gas discharged from tubes of the section nearest said fluid inlet, other conduit means connecting said sections of tubes for series flow of said gas through said sections, said other conduit means having one portion providing a space open throughout to tubes of said section nearest said fluid outlet and having its remaining portion divided into separate gas inlet passages for directing portions of said gas into separate groups of tubes of said section nearest said fluid inlet, said gas outlet conduit means providing separate gas outlet passages for receiving gas discharged from the said separate groups of tubes, and separately operable damper means associated with each of said separate gas inlet and gas outlet passages.

5. A fluid heater having upright gas conducting tubes arranged in horizontally successive groups, conduit means containing said tube groups and providing a fluid inlet and a fluid outlet between which fluid to be heated is directed over said tube groups in series in heat transfer contact therewith, gas inlet conduit means at one end of said tubes arranged to direct heating gas into tubes of the group nearest said fluid outlet, gas outlet conduit means at the same end of said tubes arranged to receive heating gas discharged from tubes of the group nearest said fluid inlet, other conduit means at the opposite ends of said tubes connecting said groups of tubes for series flow of heating gas through certain of said tube groups, said other conduit means being arranged to receive gas discharged from said group of tubes nearest said fluid outlet and to direct said gas into said group of tubes nearest said fluid inlet, said other conduit means having partition means and separately operable damper means therein whereby a portion of said discharged gas is directed into a plurality of tubes of said group nearest said fluid inlet and the remaining portion of said discharged gas is directed into the remaining tubes of the same group.

6. An air heater having gas conducting tubes arranged in successive banks, a plurality of said successive banks constituting one set of said banks and a remaining plurality of said successive banks constituting a separate set of said banks, conduit means containing all of said tube banks and providing an air inlet and an air outlet in opposed relation for directing air over said sets of tube banks in series in heat transfer contact therewith, gas inlet conduit means arranged to direct heating gas into the tubes of said one set of said banks which is disposed adjacent said air outlet, gas outlet conduit means arranged to receive said gas from the tubes of said separate set of said banks which is disposed adjacent said air inlet, other conduit means connecting said sets of tube banks for series flow of heating gas through said sets and having partition means forming a passage separately connecting the tube bank nearest said air outlet to the tube bank nearest said air inlet, said other conduit means also providing a second passage separately connecting other tube banks positioned intermediate those banks connected by said first named passage, and separately operable damper means in each of said passages.

7. An air heater as claimed in claim 6 wherein said tubes are arranged upright and said passages are formed with walls having removable closures for the introduction of a tube washing liquid into the upper ends of tubes in at least said bank nearest said air inlet, said gas outlet conduit means having a sloping bottom portion below the lower ends of tubes in at least said air inlet bank for receiving washing liquid discharged therefrom.

References Cited in the file of this patent

UNITED STATES PATENTS

| Number | Name | Date |
|---|---|---|
| 1,914,604 | Keenan, Jr. et al. | June 20, 1933 |
| 2,069,519 | Creutz | Feb. 2, 1937 |

FOREIGN PATENTS

| Number | Country | Date |
|---|---|---|
| 17,651 | Great Britain | Oct. 26, 1895 |
| 530,792 | Great Britain | Dec. 20, 1940 |
| 609,206 | Great Britain | Sept. 28, 1948 |